Jan. 11, 1966  G. SAVKO  3,228,817
METHOD OF MAKING POLYPROPYLENE ACID RESISTANT SINK TRAPS
Filed June 12, 1961  4 Sheets-Sheet 1
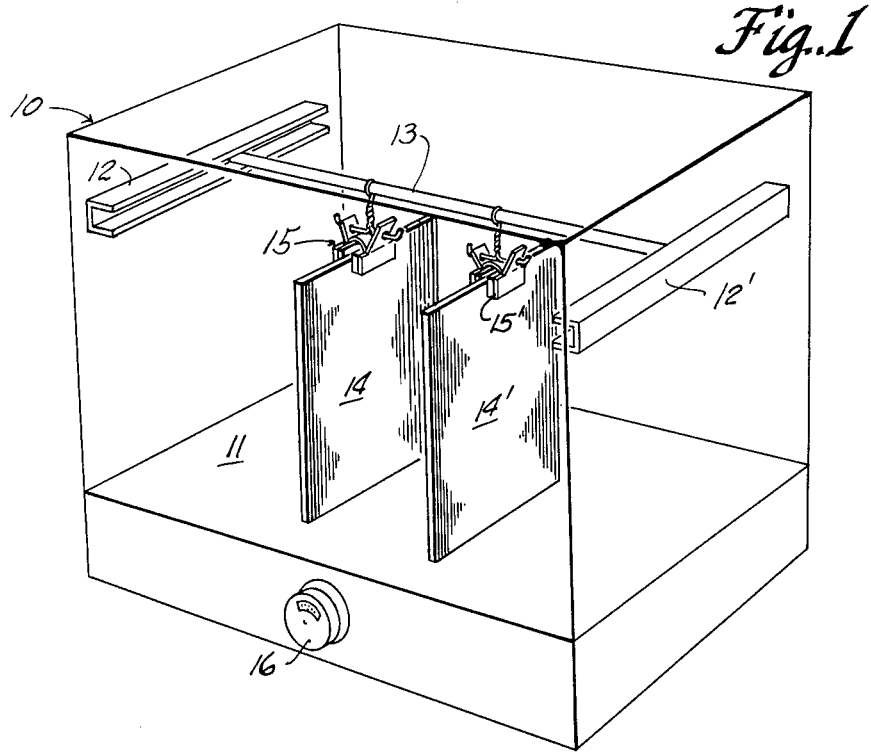
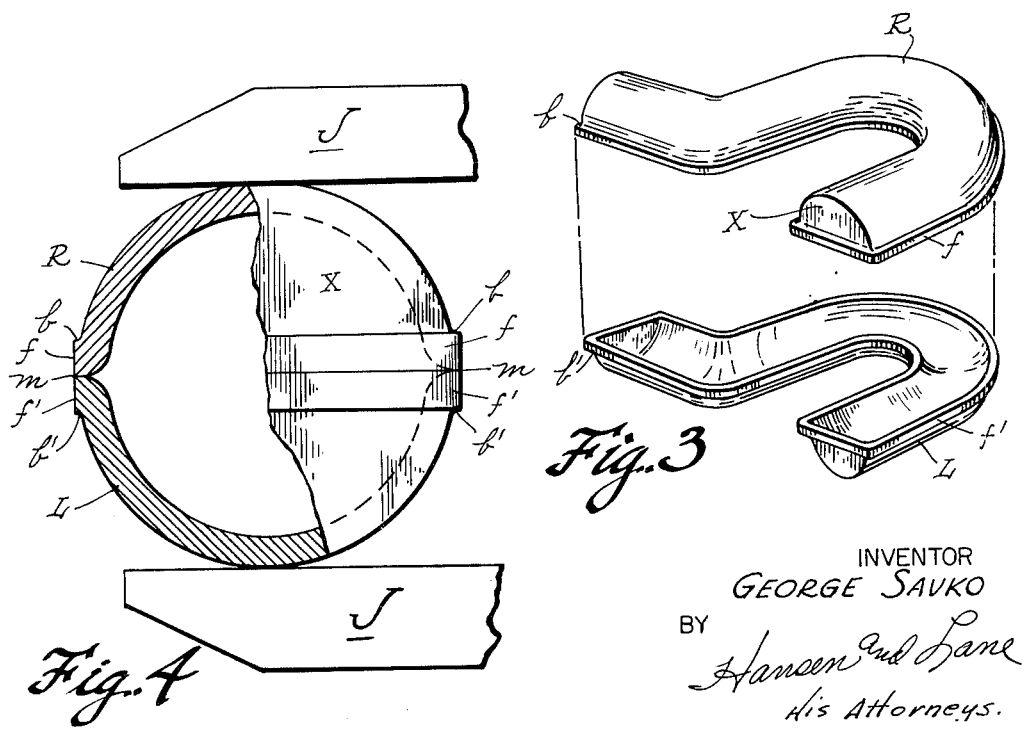
INVENTOR
GEORGE SAVKO
BY
Hansen and Lane
His Attorneys.

Jan. 11, 1966   G. SAVKO   3,228,817
METHOD OF MAKING POLYPROPYLENE ACID RESISTANT SINK TRAPS
Filed June 12, 1961   4 Sheets-Sheet 2

INVENTOR
GEORGE SAVKO
BY
Hansen and Lane
His Attorneys.

Jan. 11, 1966  G. SAVKO  3,228,817
METHOD OF MAKING POLYPROPYLENE ACID RESISTANT SINK TRAPS
Filed June 12, 1961  4 Sheets-Sheet 3

INVENTOR
GEORGE SAVKO
BY
Hansen and Lane
His Attorneys.

Jan. 11, 1966  G. SAVKO  3,228,817
METHOD OF MAKING POLYPROPYLENE ACID RESISTANT SINK TRAPS
Filed June 12, 1961  4 Sheets-Sheet 4
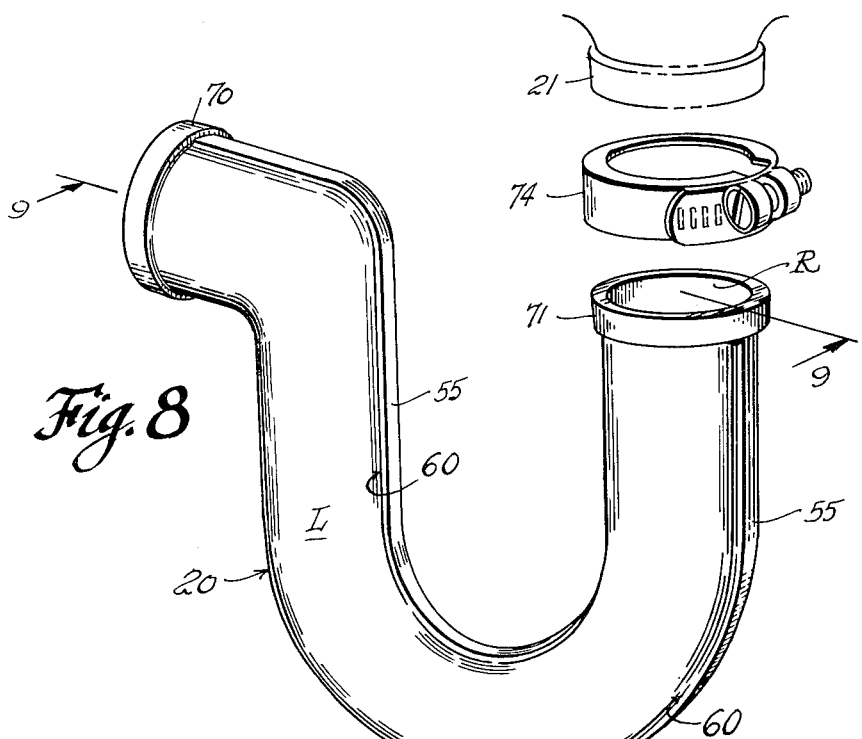
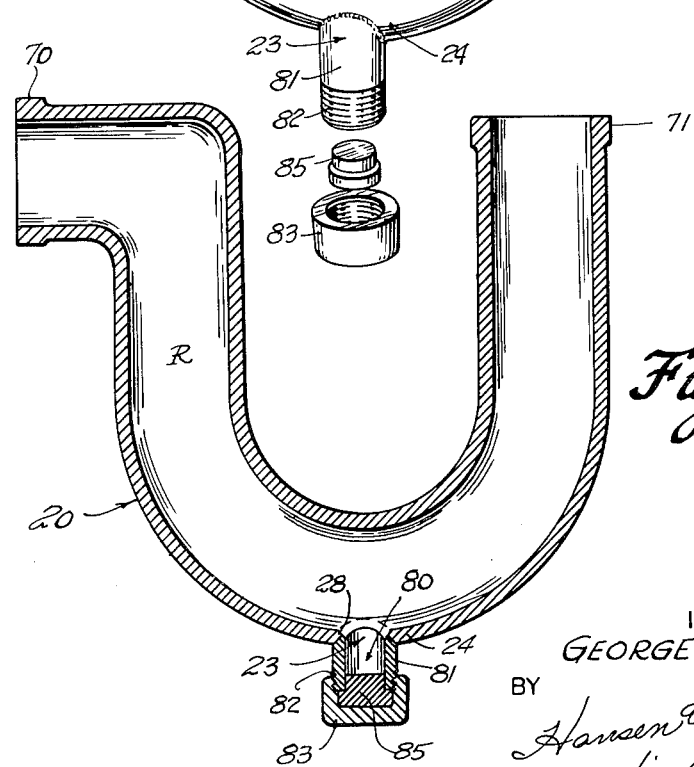
INVENTOR
GEORGE SAVKO
BY
Hansen and Lane
His Attorneys 3,228,817
METHOD OF MAKING POLYPROPYLENE ACID RESISTANT SINK TRAPS
George Savko, 1051 Bernardo Ave., Sunnyvale, Calif.
Filed June 12, 1961, Ser. No. 116,397
8 Claims. (Cl. 156—82)

This invention relates to a process for making a sink trap and more particularly to the method of manufacturing polypropylene acid resistant traps for sinks and the like.

In the electronic industry today it has become the practice to use etched diagrams in which a conductive material mounted on a non-conductive panel or plate is etched away with acids leaving only that portion of the conductive material on the panel which is required to provide an electrical circuit. More particularly in connection with the guided missiles programs and other electronic circuits employing the so-called printed form of wiring very precious metals are used at least semi-precious metals and in many instances gold which when etched away must be salvaged or otherwise become lost when washed away down the drain with other waste materials.

As a result of the prolific use of acids in the laboratories of these electronic plants it has become necessary to use acid resistant materials particularly in connection with sinks and basins as well as the soil pipes in waste lines leading therefrom. While certain alkalines are being added to the water system in flushing out these acids in order to lower the pH thereof, in many instances soil pipes and drain lines of metallic kind have been eaten away in a period of days or weeks requiring complete replacement thereof.

It has now become a practice to use polypropylene tubing or piping in connection with the drain pipes in various of these institutions. This has proven satisfactory in connection with straight tubing but as yet it has not been feasible or practicable to mold elbows and particularly U-shaped components of a drain line of polypropylene material. As a result in many institutions it has been customary to have blown glass traps but here again the difficulty lies in the fact that such traps are brittle and will break if unduly struck by a tool or an instrument. Moreover, certain acids such as fluoric acid will eat right through the glass thereby causing considerable damage and often harm to laboratory employees by either contact or from the fumes thereof to say nothing of the cost in replacing such glass parts which in and of themselves are quite expensive.

Many attempts have been made to mold or otherwise blow or form polypropylene tubing into a trap suitable for use in the sinks and basins to no avail. The reason for such failures is that polypropylene material is very difficult to handle and cannot be formed or molded in any fashion unless heated to a sufficient degree.

In this connection it might be enlightening to note that polypropylene is very sensitive and that at excessive heats, or when heated for too long a period, it will become so lax as to string out like taffee. In such condition it will entirely collapse. In a molten stage the polypropylene actually seeks level and adheres so tenaciously to other materials especially metal with the result that it is not only difficult to remove but is wasted because it can no longer be used. This waste of the material is of itself expensive.

The present invention is the result of discoveries brought about through extensive experimentation and much loss of material. As a result of this extensive experimentation I have taken the unobvious course of starting with a flat sheet of the polypropylene material, bring the same to a proper heat to facilitate its pliability yet overcome its plasticity; mold the same in halves which when cooled fit perfectly together and then provide the halves with a welded seam in accordance with the instant invention, provide a suitable trap of acid resistant characteristics which will endure not only rough handling but also the deteriorating effect of all acids including the most potent of all, the hydrofluoric type.

It is an object of this invention to provide a method or process by which to form an acid resistant sink trap of polypropylene material.

Another object is to set forth the steps which if followed will result in a commercially acceptable trap of the acid resistant type.

These and other objects and advantages of the present invention will become apparent from a reading of the following description and claims in the light of the accompanying drawings and illustrations in which:

FIG. 1 is a phantom perspective view of an oven embodying a rack and means for supporting sheets of polypropylene preparatory to molding the same.

FIG. 3 is an exploded perspective view of two pre-formed sheets molded into companion halves.

FIG. 4 illustrates the two molded halves shown partially in section clamped together preparatory to welding a seam thereon.

FIG. 8 is a perspective view of a completed trap.

FIG. 9 is a vertical section through the complete U-shaped trap.

Figure 2:
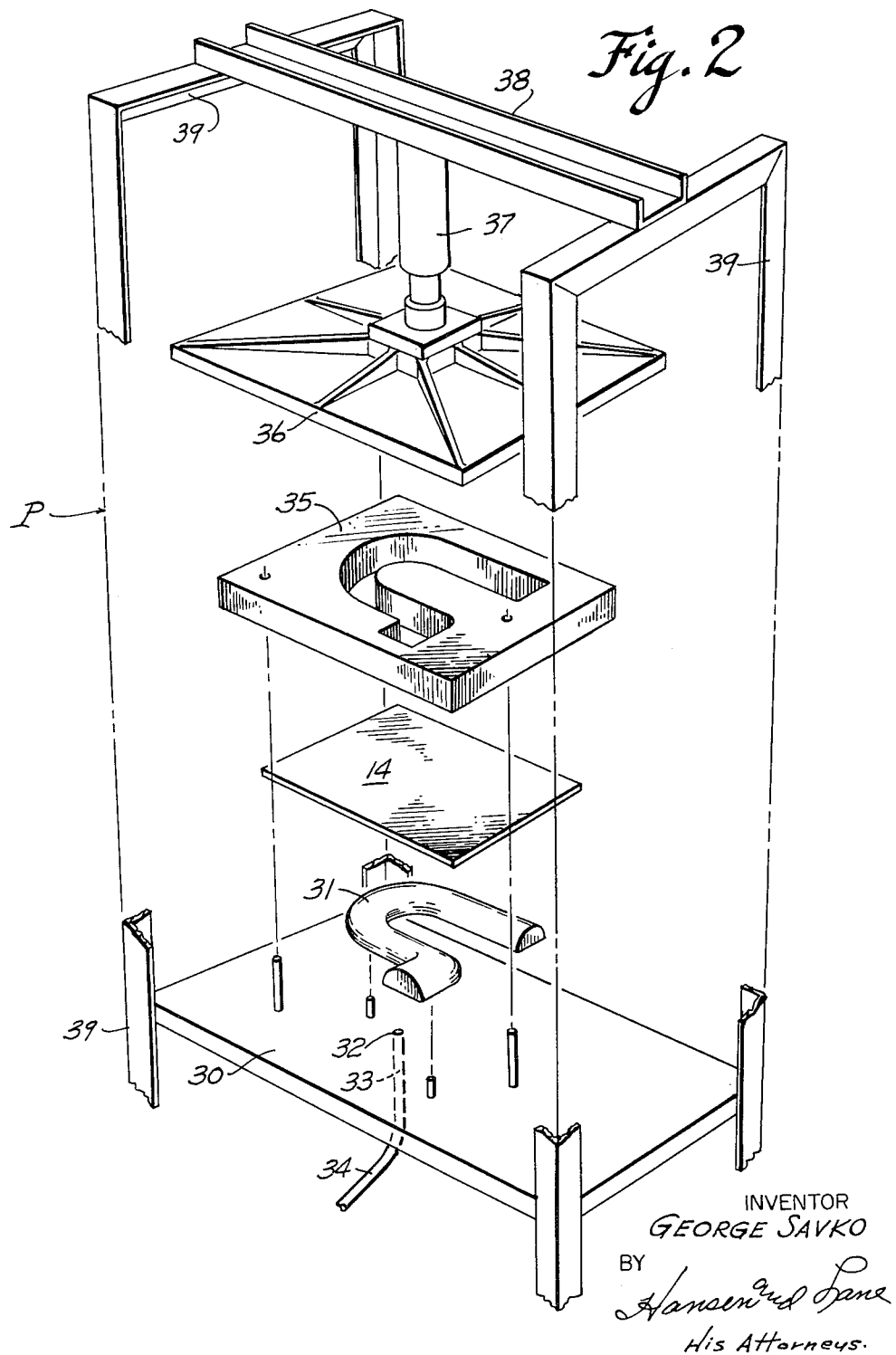
FIG. 2 is an exploded perspective view of a press and mold for pre-forming the polypropylene sheets.

Referring to FIG. 1 of the drawings an oven 10 is shown in phantom as including an oven chamber 11 suitably insulated and having therein side brackets 12–12' supporting an overhead beam 13 by which sheet material 14 can be hung from clamps 15 in a vertical disposition within the oven chamber 11.

The oven 10 has a suitable control 16 for its heating faculty (not shown) and of course the oven chamber 11 has a closure at its front as is the case in most oven structures so that the sheet material within the oven chamber is completely confined therein during heating of the sheet material. A glass front on the oven is desirable for the purpose of detecting the condition of the sheet material 14 preliminary to removal thereof from the oven.

The sheet material 14 employed in conjunction with the present invention is preferably known under the name polypropylene. This is a plastic material which when cooled is firm and rigid as well as light weight and has a faculty to withstand the corrosive or eating characteristics of any acid. In connection with the present invention I have found that sheet material of quarter inch (¼″) thickness is the most desirable for the making of a conventional size trap. The completed trap to be made in accordance with the present invention is illustrated at 20 in FIG. 8 of the drawings and in accordance with plumbing practices this trap 20 is adapted to be connected to the drain opening or throat 21 of a conventional sink or basin 22 which is likewise made of acid resisting material. In connection with a trap 20 of the present nature a clean out port or recess 23 is provided at the very bottom of its bight portion 24 for the purpose of capturing precious or semi-precious metals which would ordinarily be flushed away with waste matter during drainage thereof from the sink.

In the process of making up the trap 20 from acid resistant polypropylene material the present invention contemplates the forming of two trap halves L and R as best illustrated in FIG. 3. Accordingly in the steps of making such a trap we begin with two sheets of polypropylene material 14 and 14' each preferably of a size of 14 inches by 14 inches (14" x 14") suitable for forming one half L or R each of the trap as illustrated. As previously stated the most suitable thickness for the intended purpose is a quarter inch (¼") sheet of polypropylene material.

The first step in accordance with the present process is to hang the two sheets 14–14' in spaced relation to each other from the cross beam 13 within the oven 11. In this connection it will be noted that suitable clamping means 15 and 15' are provided in the oven and suspended from the cross beam 13 so as to clampingly engage each sheet 14 or 14' adjacent the upper edge of each of the two sheets. In accordance with the present invention the clamping means must be provided with stone faced jaws so as to have a facia which will not adhere to the polypropylene material when it becomes plastic or in a near plastic state.

I have discovered that with polypropylene sheets of one quarter inch thickness as above explained the sheets must be heated to a temperature of two hundred ten degrees (210°) centigrade and remain in the oven at such heat for a period of twenty-five minutes. From past experience it has been discovered that any excessive heating or prolonged heating of these plastic sheets at the temperature indicated will cause these sheets to become so plastic that by their own weight they will pull away from the clamps very much like taffee and string out and ultimately drop to the floor of the oven. Upon resting on the floor of the oven the polypropylene will level out like a very thick substance which when touched by anything will give off long strings or threads of the plastic material. In other words, in this state of plasticity the polypropylene will pull away like a thin honey or tar substance.

For various thicknesses of polypropylene the time of heating varies while the temperature remains the same. The working schedule would be as follows:

| Temperature, ° C. | Thickness, inch | Time, minutes |
| --- | --- | --- |
| 210 | ⅛ | 12 to 13 |
| 210 | ¼ | 25 |
| 210 | ⅜ | 26 plus |
| 210 | ½ | 37 |

Accordingly it is imperative to the present invention that this plastic material be removed from the oven at precisely the right time prior to attaining a stretchable condition. It is the object at this point that the material be pliable sufficiently to drape over a mold form so as to assume the shape desired but not plastic enough so as to adhere to any other material contacting the sheets.

Referring now to FIG. 2 in the drawings the press P therein shown comprises a press base 30 which is a cold plate of either heavy steel, marble or any other suitable smooth and firm material. Upon this base is set a male mold 31 which may or may not necessarily be secured in place on the press base. The very center of the press base 30 is provided with an orifice 32 communicating with a vacuum tube 33, the opposite end of which is connected with a suitable vacuumizing line 34 which is valve controlled by well known means, not shown. The orifice 32 is preferably located just adjacent bight portion of the U shaped male mold 31 to withdraw air from the mold surface as the plastic sheet 14 now at the proper heated condition as previously explained, is placed over the male mold resting on the press base 30. The heated sheet 14 will immediately begin to relax itself about and around the male mold thus defining the same sufficiently for positioning of a female mold 35 over the same. The plastic material will be pressed against the male mold 31 by the female mold 35 but not with sufficient pressure to assure a perfect form. As shown in FIG. 2 the press further includes a press plate 36 on a hydraulic ram 37 suitably anchored to a cross beam 38 on the framework 39 of the press. When the male and female dies or molds are positioned properly over the plastic sheet 14 the press plate 36 is forced down upon the same by a hydraulic pressure. At the same time vacuum is created on the underside of the sheet 14 to thereby remove all air bubbles as the sheet is pressed firmly and accurately around the male mold. The pressure of the press plate against the two dies and press base is approximately four tons per square inch and at the same time a vacuum of twenty five inches of mercury was released against the plastic via the vacuum tube 33 and orifice 32. The press plate 36 is allowed to remain in the closed position as just explained, i.e. under pressure, for a sufficient length of time to allow the plastic material to cool and again become rigid. In other words, the polypropylene sheet must remain in the press and between the molds for a sufficient length of time to assure that no warping will occur in the pre-molded sheet after removal thereof from the press and two dies or molds.

Upon cooling the plastic material takes the shape of a half trap. The material can now be stripped from the female die and the male die removed from the half recess form on the underside of the sheet 14. Assuming that the two dies have been accurately aligned with each other the thickness of the pre-formed half trap will be uniform throughout and it will have a flange like fringe by reason of the remaining portions of the 14" x 14" sheet surrounding the pre-formed trap half. The plastic material now being sufficiently cooled and rigid the pre-formed trap half can be placed, flat surface down, upon the bed of a band saw by which the excess (flange) material is trimmed away from around the half molded half trap. This leaves a substantial bead $b$ of approximately 1/16" projection beyond the periphery or the perimeter of the half trap, see for example FIG. 4.

In the illustration of FIG. 2 only the right hand half trap portion R is molded it being understood that in the molding of the other half trap portion L a male mold of the reverse or opposite form is used and the female mold 35 is turned upside down fitting exactly as previously explained upon the left hand type of male mold employed. The partially finished or pre-molded left half trap L is then cut around its perimeter as previously explained in connection with the half trap R so that the two halves appear as shown in FIG. 3. When the two trap halves R and L are brought together flat surface to flat surface, the cavities thereof will be aligned with each other and the perimeter beaded edges $b$ of the two halves are likewise aligned completely around the entire pre-molded halves.

The two pre-molded halves R and L are next clamped together between jaws J of a clamp or vice in the manner as illustrated in FIG. 4 wherein any irregularities in the peripheral facing F adjacent the beads $b$–$b'$ can be scraped flat providing smooth facia $f$ and $f'$ on the beads $b$–$b'$ respectively preparatory to the welding operations.

WELDING OPERATIONS

Initial weld

Figure 5:
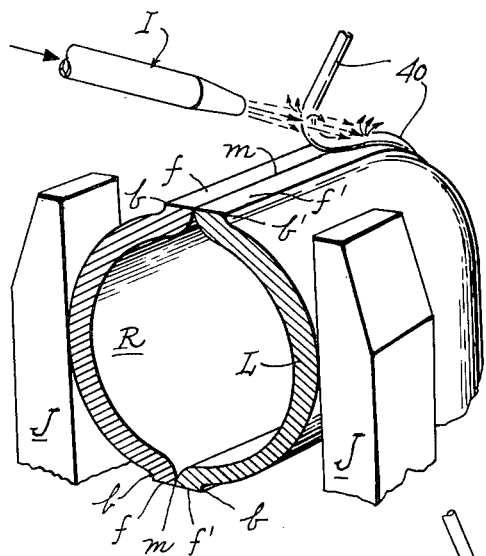
FIG. 5 is a perspective view of a fragment of the two molded halves clamped together receiving an initial weld.

The first step in the welding operation consists in the application of a strip or rod of polypropylene material to the meeting line $m$ between the two halves which are clamped together. This is best illustrated in FIG. 5 wherein a polypropylene welding spline 40 of ⅛" diameter is shown being welded to the two bead facias $f$ and $f'$ over the meeting line therebetween. In the making of this weld a heated air torch is employed. This torch has a nozzle through which air blown from a compressor is heated to approximately two hundred and ten degrees (210°) centrigrade within the torch. The nozzle I for the initial weld tapers down to a very small orifice from which air is discharged so as to strike the welding spline 40. The polypropylene spline which is relatively stiff will upon being heated bend or bow slightly or sufficiently as it is fed onto the meeting line $m$ as illustrated in FIG. 5. The major heat of the heated air emitting from the nozzle I strikes the spline 40 behind the bowed or preheated portion thereof so as to melt the spline and part of the joined trap halves sufficiently to create a weld $w$ between the two adjoining half traps. This operation is repeated around the entire perimeter of the two trap halves as they are secured together in a clamp or vice. In this manner the two trap halves are joined together in perfect alignment with each other and form a complete cavity therein.

Figure 6:
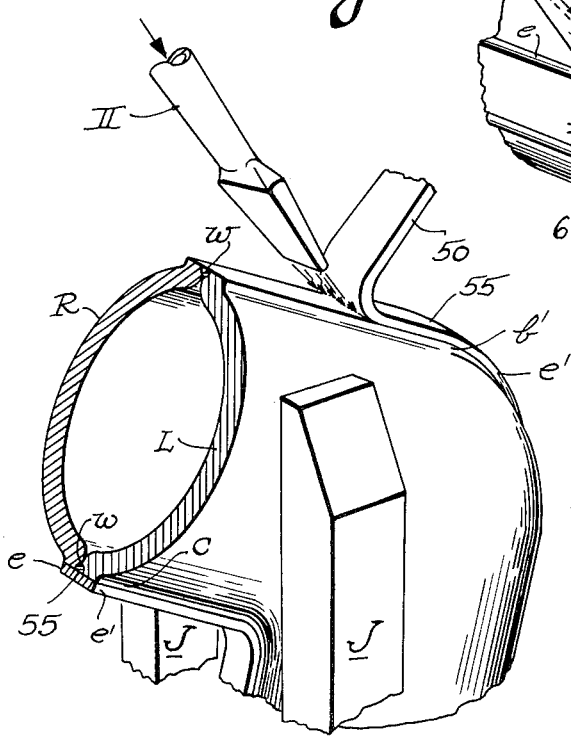
FIG. 6 is a perspective view of a fragment of the two halves clamped together and receiving a weld seam.

While the foregoing initial weld would seemingly be sufficient to provide an air tight joint for a trap or tube of U shape it will be noted in FIG. 5 showing the cross sectional view of the two joined halves traps R and L, that the outward curvature of the material at the meeting line $m$ leaves a relatively thin area in the two joined elements. Consequently for safety sake and in order to create a leak proof joint in accordance with the present invention the next step is to scrape or cut the excess material of the initial weld down to the flat facia $f$—$f'$ as illustrated in FIG. 6. Note in this view that the initial weld $w$ now consists of a very small half round monolyth at the meeting line $m$. When the two beads are adequately surfaced by scraping of the initial weld down to substantially the level of the two adjoining facias $f$ and $f'$, the next step is to apply a cover weld over the flat perimeter of the two now joined trap halves.

Cover weld

In the weld illustrated in FIG. 6 a ribbon strip 50 of polypropylene is applied and the same kind of welding torch is employed. That is to say a torch is used in which air is blown from a compressor through a heating element which will raise the temperature of the air blast to approximately two hundred ten degrees (210°) centigrade. The nozzle, however, is changed to the one indicated II in FIG. 6 and having a fan shaped orifice at its discharge end so as to spread the discharge air in a flat fan like spray into the crevice provided between the welding strap 50 and the surfaces $f$ and $f'$ of the two beads at the perimeter of the joined trap halves R and L. In this weld the hot air discharges against the rigid welding strap 50 allowing it to be bowed as it is gradually laid in place. Both the strap 50 as well as the two joined surfaces $f$ and $f'$ of the trap halves are struck by the fan-like blast of air at 210° C. rendering the material of each to a molten state as the two are gradually brought together progressively around the perimeter of the joined trap halves. In this manner the entire perimeter of the two trap halves is built up to a thickness comparable to the thickness of the remaining portions of the trap by a cover weld 55. The thickness at the strap weld 55 is suitable to withstand any of the pressures within the trap as well as to assure against the possibility of any pin holes or the like at the meeting line $m$ through which leakage can occur.

Finishing weld

Figure 7:
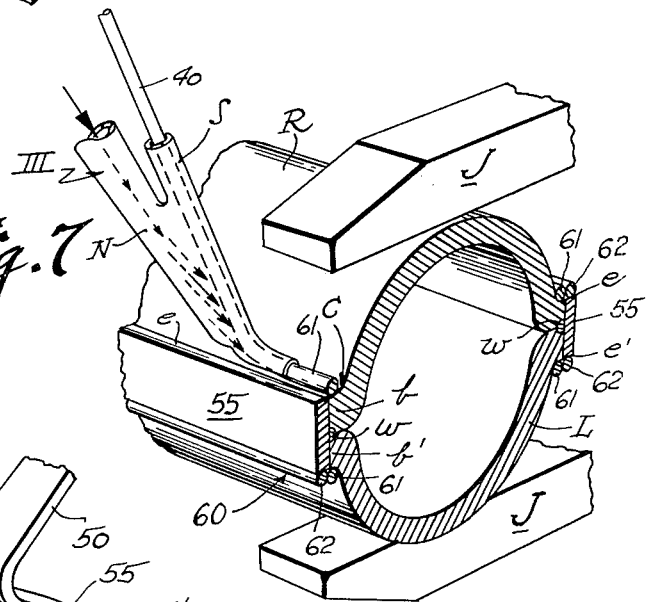
FIG. 7 is a perspective view of a fragment of the two molded halves clamped together receiving a finishing weld.

A finishing weld 60 is preferably applied to the two trap halves R and L joined in the fashion as shown in FIG. 7. As shown in FIG. 7 the trap halves are still supported in a clamp or a vice in such a position to facilitate the application of welding spline or rod similar to the rod 40 in the initial weld, to the marginal edge $e$ of the flat weld. That is to say, in the zone between the cove C of a particular trap half and the cover weld 55. Two such spline welds 61 and 62 are made. In the first 61 a rod or spline weld is made in the cove C and this is done with the use of a different type nozzle III. The nozzle III is one which has a yoke shape there being one tubular sleeve S thereof through which the welding rod may be fed, and the other portion N of the yoke being a nozzle via which the blast of hot air at 210° C. is discharged from the torch against the end of the welding rod 61.

The second finishing weld 62 is the same as the first except that it is made between the first 61 and the edge of the cover weld 55 as depicted in FIG. 7.

After the foregoing welding operations the two halves R and L are completely sealed around the perimeter including both ends of the cavity between them. At this stage the partially finished trap 20 can be tested for leaks by piercing one end, for example end X FIG. 3, with an air needle so that air under pressure can be blown into the cavity. With the entire sealed unit under water, air bubbles coming from any place on the unit will indicate a flaw or pin hole leak which should be corrected when established that no leak could occur, the two ends of the trap are cut off so that passage of fluid through the trap can occur.

Another manner of testing for leaks would be after the ends are removed by using a high frequency charge of electricity eminating from a spike-like pole applied to the inside of each weld while holding a ground pole on the outside. The polypropylene being an insulator, if a spark jump occurs through the joint, this would indicate a pin hole through which a leak could occur.

Referring now to FIG. 8 the trap is finished by the welding of a flange 70–71 to each open end thereof. These flanges are made from a strap of flat polypropylene material as in the case of the cover weld. These flanges are dimensioned to fit coupling means, such as for example as the marmon clamp 74 shown in FIG. 8 whereby to connect the trap 20 in a drain line.

The trap 20 is thus completed from the standpoint of providing a suitable acid resistant trap for the drain lines from laboratory sinks and/or basins. As previously stated, certain laboratories requiring the use of acid resistant traps are concerned with the recapture of precious and semi-precious metals in the drainage. For such requirements the clean out port 23 consists of a drain sump 80 applied to the lowermost point or bight 24 of the trap 20 as illustrated in FIGS. 8 and 9.

The drain sump 80 is made of a short length of polypropylene tubing 81 machined and threaded as at 82 at one end to receive a cap 83 preferably made of polypropylene material. In the event a plastic or metal cap is employed a plug 85 of polytetrafluoroethylene material is inserted therein to engage the open end of the utbe 81 to provide an acid resistant seal therefor. The opposite end of the tubing 81 is pre-formed to merge neatly with the bight portion 24 of the trap 20 and to fit into an opening 28 cut through the same. The tubing 81 is then welded to the trap by the use of welding spline 40 and a welding torch in the manner above explained in connection with the initial weld. Several layers of spline may be applied as required.

By the use of the drain sump 80 heavier metals such as gold, silver and other semi-precious metals will gravitate into the sump and be thereby entrapped for recapture upon removal of the cap 83.

While I have expalined the steps and requirements for my method of making polypropylene traps and bent fittings in specific detail it will be appreciated that one may without departing from the spirit of my invention adapt certain variations, alternations and/or modifications other than those specifically defined as critical to the process herein defined. I therefore desire to avail myself of all variations, alterations and/or modifications as fairly come within the purview of the appended claims.

What I claim as new and desire to protect by Letters Patent is:

1. The method of making an acid resistant U-shaped sink trap consisting in subjecting a pair of one quarter inch thick sheets of polypropylene to a temperature of 210° centigrade for a period of twenty-five minutes, placing said sheets between separate male and female molds until cooled to form them into rigid left and right trap halves, clamping said rigid trap halves together with their cavities in register with each other, and welding said trap halves together along the meeting line therebetween.

2. The method of making an acid resistant U-shaped sink trap consisting of heating a pair of sheets of polypropylene of one quarter inch thickness to a temperature of 210° centigrade for twenty-five minutes for rendering them moldable, placing said sheets between separate molds, applying pressure to said molds with the heated sheets therebetween until the sheets cool to thereby form rigid left and right trap halves, trimming the excess polypropylene from the perimeter of each of said trap halves leaving thereon a marginal bead, clamping said trap halves together cavity to cavity with the marginal beads thereof in register with each other, and welding said marginal beads together along the meeting line thereof.

3. The method of making an acid resistant U-shaped sink trap of polypropylene material exclusively consisting of heating a pair of sheets of polypropylene to a temperature of 210° centigrade until they soften to a state such as to drape over a mold form to assume the shape if a mold form forcing said heated sheets between separate male and female mold forms until cooled to thereby form matching left and right rigid trap halves, removing said rigid trap halves from their respective molds, trimming the excess polypropylene from the perimeter of the cavity of each of said trap halves leaving thereon a marginal bead, holding said trap halves together with the marginal beads around their cavities in register with each other to form a complete trap, and welding the marginal beads of said trap halves together along the meeting line thereof.

4. The method of making an acid resistant U-shaped trap for sinks and the like consisting in heating flat sheets of polypropylene to a temperature of 210° centigrade for a predetermined time to bring them to a pliable and moldable state just prior to their becoming plastic and stretchable, placing such sheets between separate sets of male and female molds under pressure to form companion trap halves until cool and rigid, trimming the excess polypropylene from the perimeter of the cavities of each of said trap halves leaving the edges of the cavities of each of said halves a marginal bead, clamping said trap halves together cavity to cavity with the marginal beads in register with each other, initially welding said marginal beads together along the meeting line thereof, scraping said beads and initial weld to a flat facia, welding a cover strap over said flat facia, and then removing the ends of said two joined trap halves.

5. The method of making a U-shaped sink trap from polypropylene material consisting in heating two separate quarter inch thick sheets of such material to a temperature of 210° centigrade for a period of 25 minutes to bring said sheets to a moldable non-elastic state, placing such sheets respectively between left and right half trap molds under pressure while simultaneously vacuumizing the space between said sheets and the respective molds between which they lie, allowing the molded sheets to cool to a rigid state and removing them from said molds, trimming the excess sheet material from around the perimeter of each pre-mold trap half leaving a peripheral bead thereon, placing the two half traps together with their cavities in register so as to provide a meeting line therebetween bordered by said peripheral beads, scraping said beads to provide smooth facia thereon adjacent the meeting line between them, and applying a cover weld of polypropylene material to the facia of said beads.

6. The method of making a U-shaped sink trap from polypropylene material consisting in heating two separate quarter inch thick sheets of such material to a tempearture of 210° centigrade for a period of 25 minutes to bring said sheets to a moldable non-elastic state, placing such sheets respectively between left and right half trap molds under pressure while simultaneously vacuumizing the space between said sheets and the respective molds between which they lie, allowing the molded sheets to cool to a rigid state and removing them from said molds, trimming the excess sheet material from around the perimeter of each pre-molded trap half leaving a peripheral bead thereon, placing the two half traps together with their cavities in register so as to provide a meeting line therebetween bordered by said peripheral beads, scraping said beads to provide smooth facia thereon adjacent the meeting line between them, applying a cover weld of polypropylene material to the facia of said beads, removing the ends of the two now joined trap halves, and then welding a polypropylene coupling flange at each open end of said trap.

7. The method of making a U-shaped sink trap from polypropylene material consisting in heating two separate quarter inch thick sheets of such material to a temperature of 210° centigrade for a period of 25 minutes to a moldable non-elastic state, placing such sheets respectively between left and right half trap molds under a pressure of approximately 4 tons per square inch while simultaneously vacuumizing the same, allowing the molded sheets to cool to a rigid state and removing them from said molds, trimming off the excess material around the perimeter of each trap half molded therein leaving a peripheral bead, placing the two half traps together with their cavities in register and welding said trap halves together along their meeting line.

8. The method of making a U-shaped sink trap from polypropylene material consisting in heating two separate quarter inch thick sheets of such material to a temperature of 210° centigrade for a period of 25 minutes to a moldable non-elastic state, placing such sheets respectively between left and right half trap molds under a pressure of approximately 4 tons per square inch while simultaneously vacuumizing the same, allowing the molded sheets to cool to a rigid state and removing them from said molds, trimming off the excess sheet material around the perimeter of each trap half molded therein leaving a peripheral bead, placing the two half traps together with their cavities in register, welding said trap halves together along their meeting line to form a U-shaped trap, and welding a drain sump of polypropylene material to the bight portion of the U-shaped trap thus formed.

References Cited by the Examiner

UNITED STATES PATENTS

| | | | |
|---|---|---|---|
| 2,768,106 | 10/1956 | Sartakoff | 156—293 XR |
| 2,839,441 | 6/1958 | Kent | 154—43 |
| Re. 24,801 | 3/1960 | Kaminsky | 156—497 |

OTHER REFERENCES

Neumann et al.: Welding of Plastics, copyright 1959, Reinhold Publishing Corp., New York, pp. 9–29, 58 and 86 particularly relied on.

EARL M. BERGERT, *Primary Examiner.*

CARL F. KRAFFT, *Examiner.*